US010283056B2

(12) United States Patent
Kim et al.

(10) Patent No.: US 10,283,056 B2
(45) Date of Patent: May 7, 2019

(54) AUTOSTEREOSCOPIC THREE-DIMENSIONAL IMAGE DISPLAY DEVICE USING TIME DIVISION

(71) Applicant: Samsung Electronics Co., Ltd., Suwon-Si, Gyeonggi-Do (KR)

(72) Inventors: Sung Kyu Kim, Seoul (KR); Ki Hyuk Yoon, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 1349 days.

(21) Appl. No.: 13/690,476

(22) Filed: Nov. 30, 2012

(65) Prior Publication Data

US 2013/0181895 A1  Jul. 18, 2013

(30) Foreign Application Priority Data

Jan. 17, 2012 (KR) ........................ 10-2012-0005338

(51) Int. Cl.
    *G09G 3/34* (2006.01)
    *H04N 13/366* (2018.01)
    *H04N 13/32* (2018.01)

(52) U.S. Cl.
    CPC .............. *G09G 3/34* (2013.01); *H04N 13/32* (2018.05); *H04N 13/366* (2018.05)

(58) Field of Classification Search
    CPC ... G09G 3/34; H04N 13/0418; H04N 13/0468
    See application file for complete search history.

(56) References Cited

U.S. PATENT DOCUMENTS

| 5,349,379 A | 9/1994 | Eichenlaub |
| 5,777,720 A * | 7/1998 | Shapiro et al. ............... 351/237 |

(Continued)

FOREIGN PATENT DOCUMENTS

| CN | 101507287 A | 8/2009 |
| JP | 2010-529485 | 8/2010 |

(Continued)

OTHER PUBLICATIONS

Chinese Office Action dated Sep. 3, 2014 for corresponding Chinese Application No. 201310018358.2.

(Continued)

*Primary Examiner* — Patrick N Edouard
*Assistant Examiner* — Joseph P Fox
(74) *Attorney, Agent, or Firm* — Harness, Dickey & Pierce, P.L.C.

(57) ABSTRACT

An autostereoscopic 3D image display device using time division is provided. The image display device includes a backlight, an image display panel, a controller, and a viewer position tracking system. The backlight includes a plurality of line sources which are disposed at certain intervals. The image display panel displays a 3D image. The controller controls the backlight and a viewing point image of the image display panel. The viewer position tracking system determines a pupil position of a viewer and transfers position information to the controller. The image display panel provides two or more viewing points. The line sources configure two or more line source sets that are separately driven at the same time. The two or more line source sets are sequentially driven.

10 Claims, 19 Drawing Sheets

(56) References Cited

U.S. PATENT DOCUMENTS

| | | | |
|---|---|---|---|
| 8,659,641 B2* | 2/2014 | Brigham | H04N 13/0033 348/42 |
| 2006/0012878 A1* | 1/2006 | Lipton | G02B 27/2214 359/463 |
| 2006/0187179 A1* | 8/2006 | Karman | H04N 13/0454 345/102 |
| 2007/0188667 A1* | 8/2007 | Schwerdtner | G02B 27/225 349/15 |
| 2008/0068329 A1* | 3/2008 | Shestak | H04N 13/0404 345/102 |
| 2010/0128187 A1* | 5/2010 | Brott | G02B 6/0038 349/15 |
| 2010/0157026 A1* | 6/2010 | Reichelt | G02B 26/005 348/51 |
| 2011/0090413 A1* | 4/2011 | Liou | G02B 27/2214 349/15 |
| 2011/0242150 A1* | 10/2011 | Song et al. | 345/697 |
| 2011/0285700 A1* | 11/2011 | Kim | G02B 27/0093 345/419 |
| 2011/0310232 A1 | 12/2011 | Wilson et al. | |
| 2012/0224038 A1* | 9/2012 | Roth | 348/55 |
| 2012/0242568 A1* | 9/2012 | Kim | G02B 27/2214 345/156 |
| 2013/0194252 A1* | 8/2013 | Kim et al. | 345/419 |

FOREIGN PATENT DOCUMENTS

| | | |
|---|---|---|
| KR | 10-2011-0090611 A | 8/2011 |
| WO | WO 2008/032943 A1 | 3/2008 |
| WO | WO-2011/053319 A1 | 5/2011 |

OTHER PUBLICATIONS

European Search Report dated Jan. 28, 2013 in counterpart European Patent Application No. 12194782.4 (7 pages in English).

Dodgson, N.A. "On the number of viewing zones required for head-tracked autostereoscopic display," *Stereoscopic Displays and Virtual Reality Systems XIII, Proc. of SPIE-IS&T 6055*, 2006.

European Examination Report dated May 8, 2015 for corresponding EP Application No. 12194782.4.

Korean Office Action dated Apr. 22, 2013 in counterpart Korean Patent Application No. 10-2012-0005338 (4 pages, in Korean).

\* cited by examiner

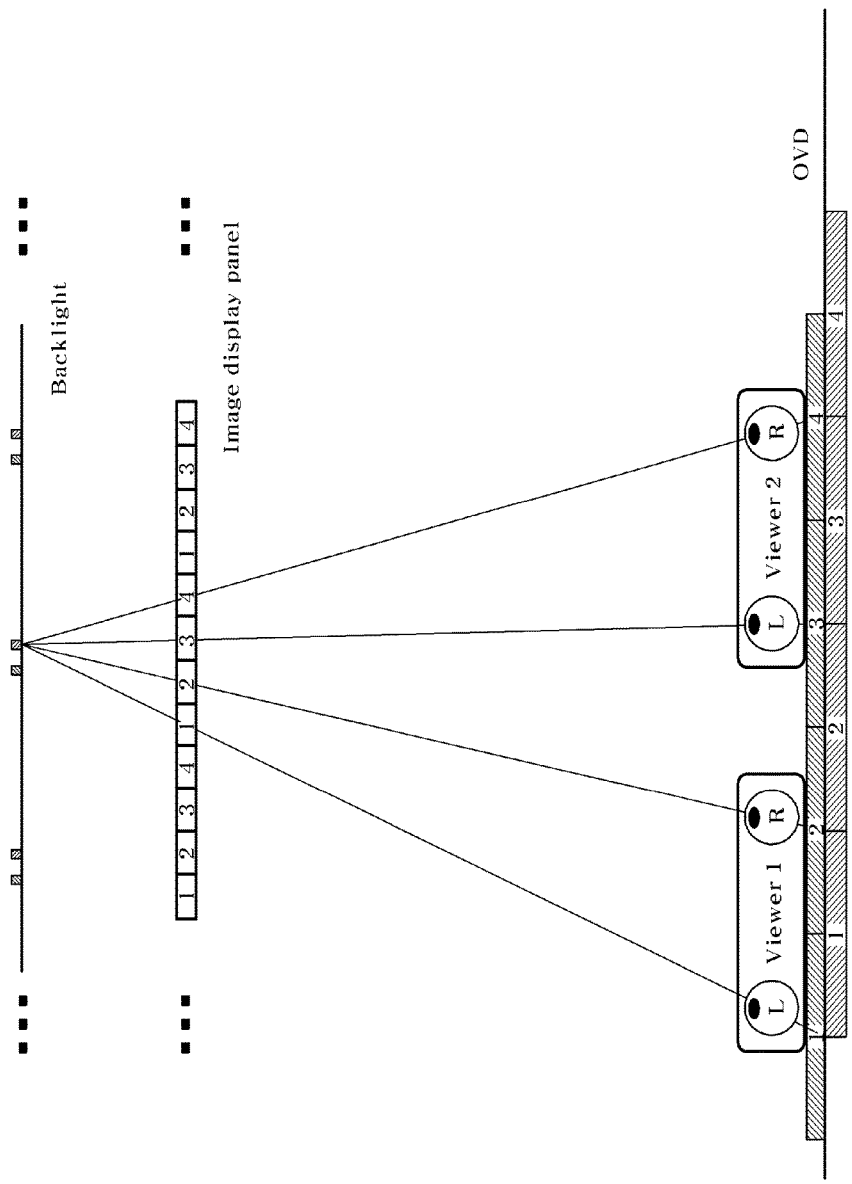

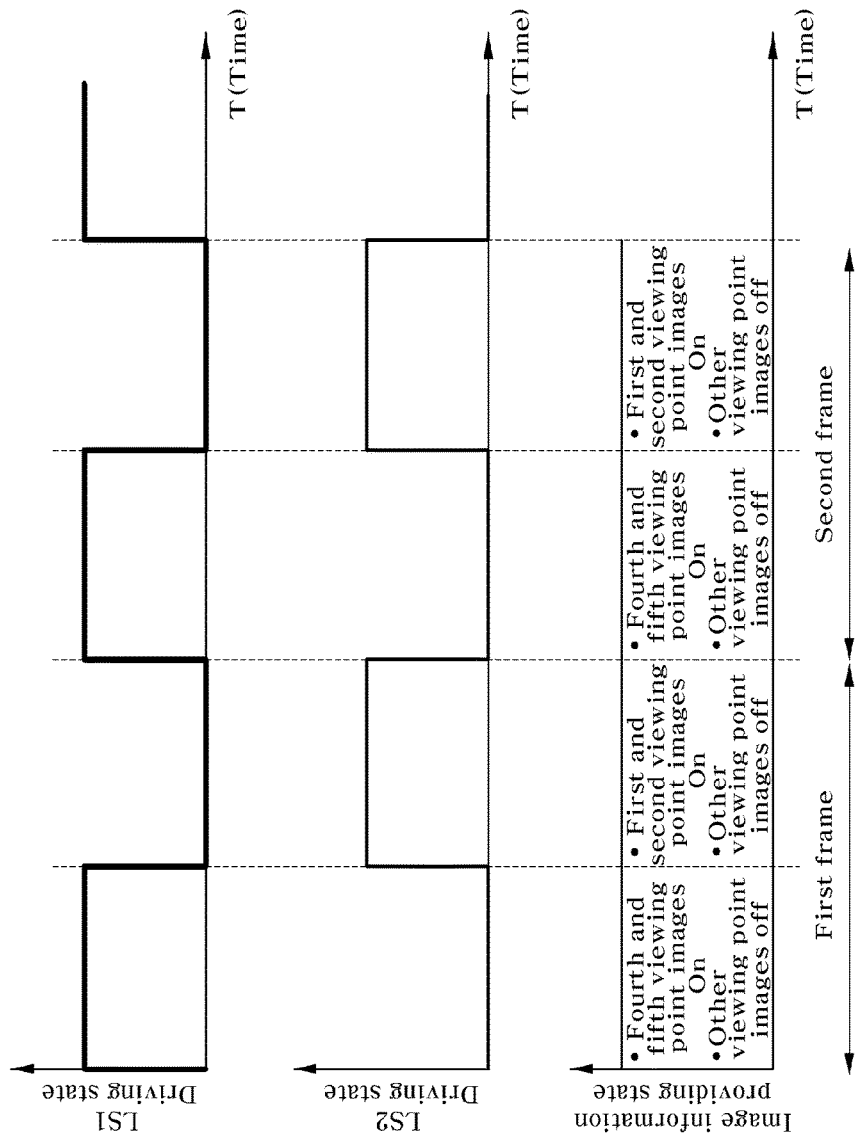

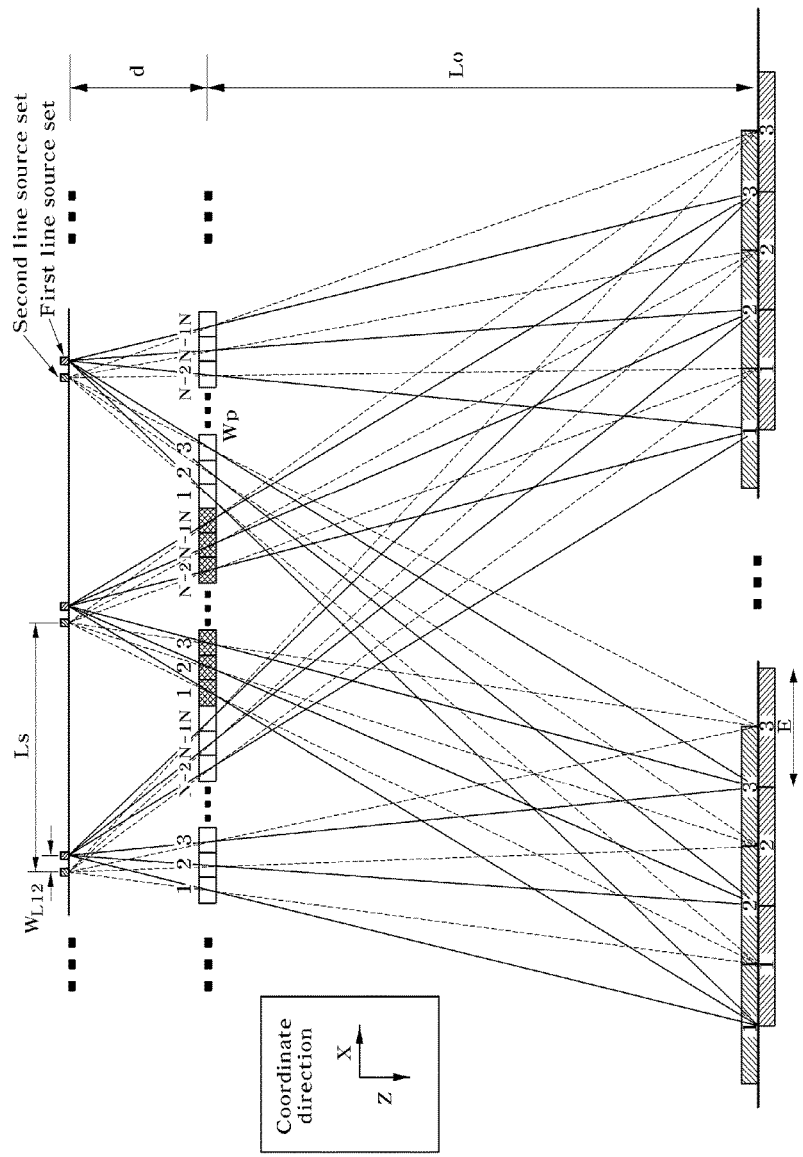

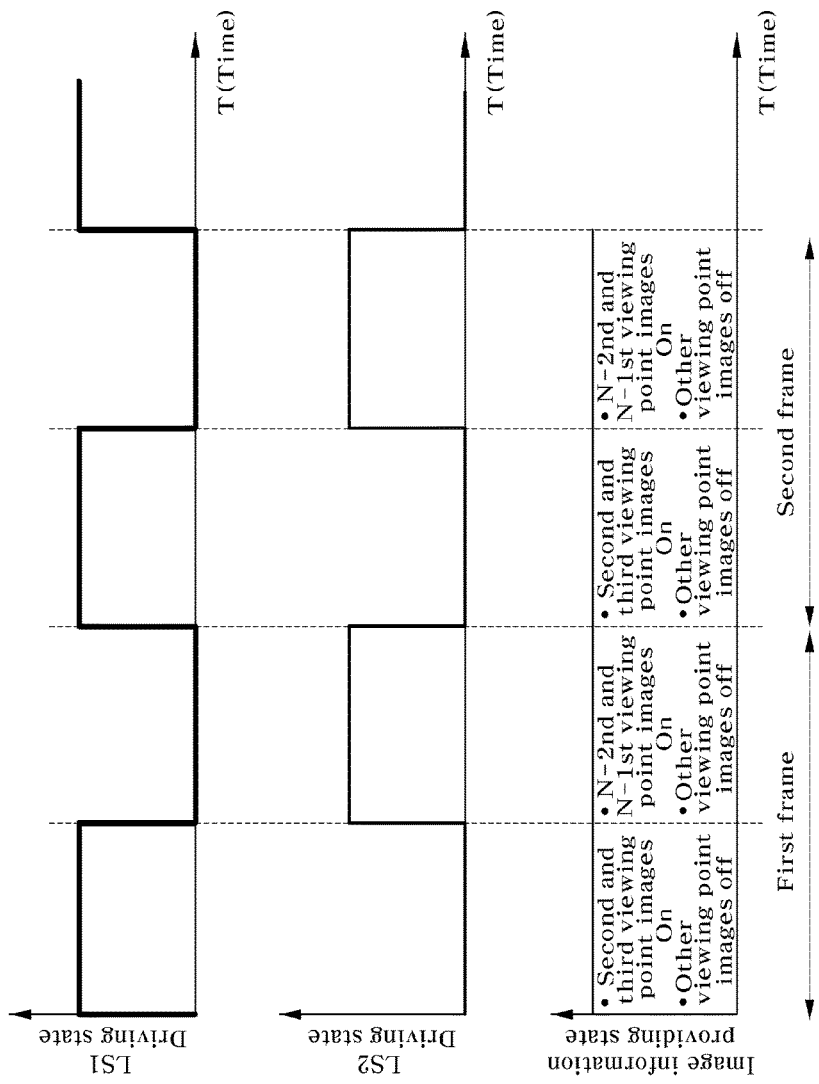

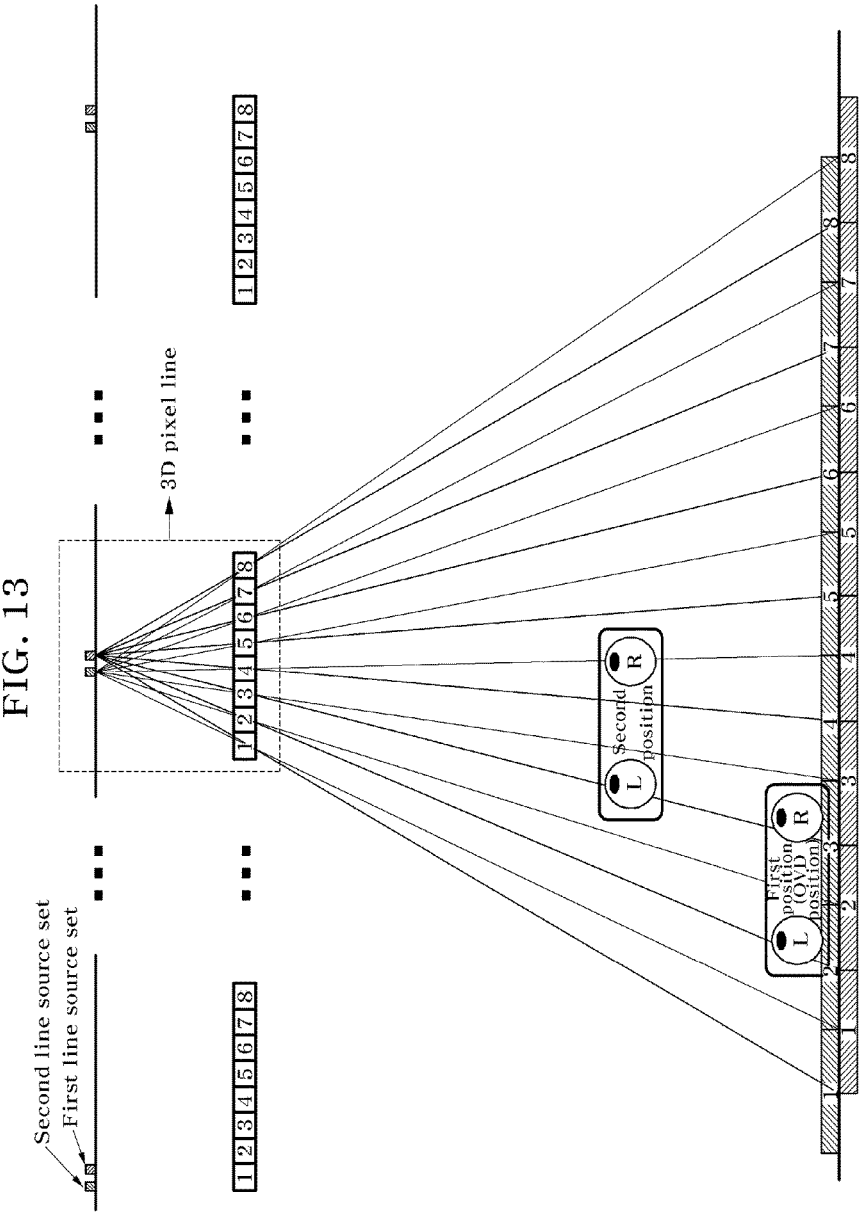

AUTOSTEREOSCOPIC THREE-DIMENSIONAL IMAGE DISPLAY DEVICE USING TIME DIVISION

CROSS-REFERENCE TO RELATED APPLICATION

This application claims priority to and the benefit of Korean Patent Application No. 2012-0005338, filed on Jan. 17, 2012, the disclosure of which is incorporated herein by reference in its entirety.

BACKGROUND

1. Field of the Invention

The present invention relates to an autostereoscopic three-dimensional (3D) image display device, and more particularly, to an autostereoscopic 3D image display device that forms a viewing zone by using a plurality of line sources without using an optical plate such as a lenticular lens or a parallax barrier, and alternately drives two or more line source sets within an image-sticking time through a time division scheme, thus having enhanced resolution compared to the existing scheme.

2. Discussion of Related Art

General autostereoscopic 3D image display devices form a viewing zone by using an optical plate such as a lenticular lens or a parallax barrier. In this case, a viewer separately views a left-eye viewing point image and a right-eye viewing point image from a viewing position, and thus views a 3D image. However, there are some limitations in commercializing autostereoscopic 3D image display devices at present.

First, crosstalk occurs between binocular viewing point images, and the brightness of each of the binocular viewing point images is not uniform horizontally. Due to this reason, a viewer feels severe fatigue when continuously viewing 3D images, and the quality of an image is degraded even by slight horizontal movement. As an example, FIG. 1 shows the brightness distribution of viewing zones by viewing point according to horizontal movement from the optimum viewing position in a conventional autostereoscopic 3D image display device using a parallax barrier or a lenticular lens. In FIG. 1, on the assumption that an interval (about 65 mm) between viewing points is the same as an interval between the left-eye pupil and right-eye pupil of a viewer, when the viewer at the optimum viewing position is located in the front of a 3D image display device, the left eye of the viewer is located at the center (position A) of a first viewing zone, and the right eye of the viewer is located at the center (position C) of a second viewing zone, both eyes of the viewer respectively deviate from the position A and the position C and then the image brightness of a corresponding viewing zone for each viewing point becomes dark rapidly, lowering the quality of an image. Also, crosstalk occurs in which a first viewing point image disposed in the first viewing zone and a second viewing point image disposed in the second viewing zone are simultaneously viewed by the left eye of the viewer, and the second viewing point image disposed in the second viewing zone and a third viewing point image disposed in a third viewing zone are simultaneously viewed by the right eye of the viewer. Especially, when the left eye of the viewer is located at a middle position (position B) between the first and second viewing zones and the right eye of the viewer is located between the second and third viewing zones, the maximum crosstalk occurs.

Second, as the number of viewing points increases, the resolution of an image display panel decreases proportionally. Particularly, for a plurality of viewers, the resolution of an image display panel being reduced in proportion to the number of viewing points is a large drawback.

Third, in conventional autostereoscopic 3D image display devices, only a viewer who is located at a specific position (optimum viewing position) away from an image display device can view a clear 3D image. Consequently, when a viewer moves in a depth direction, the viewer cannot view a 3D image normally. This will now be described with reference to FIGS. 2A to 2D.

FIGS. 2A to 2D are diagrams for describing an example of a conventional autostereoscopic 3D image display device using a four-viewing point parallax barrier. In the optimum viewing position, viewing zones for respective viewing points are well separated as in FIG. 1, but if a viewer deviates from the optimum viewing distance (OVD) position in a depth direction and moves to a position P1 (position at a distance 0.5 times the OVD), a viewing zone for a left-eye viewing point and a viewing zone for a right-eye viewing point are not normally separated or overlap with adjacent viewing zones so that the viewer cannot normally view a 3D image (see FIG. 2C for a viewing distribution at the position P1). Also, although not shown in FIG. 2, even when the viewer moves to the position at the distance 1.5 times the OVD, as shown in FIG. 2D, a viewing-zone shape is changed, and thus crosstalk increases. To provide a more detailed description on this with reference to FIG. 2C, considering the intersection of boundary lines between viewing zones in a dot line illustrated at the position P1 of FIG. 2A, when a pupil is located at the center of a viewing zone for one pixel at the position P1, although a viewing zone closest to the center of the pupil is selected from among viewing zones for different openings, depending on the case, much crosstalk is caused by all openings when a pupil is located at a boundary line between viewing zones. In this case, as described above, crosstalk per opening is inevitably maximized or nearly maximized. Therefore, crosstalk increases on average. This case occurs when a viewer deviates from the OVD. Accordingly, when a viewer deviates considerably from the OVD, much crosstalk occurs at all positions.

Finally, conventional autostereoscopic 3D image display devices are designed so that one viewer can view a 3D image but not for a plurality of viewers to view a 3D image from different positions.

Therefore, there is need to develop an autostereoscopic 3D image display device that overcomes the above-described limitations, and moreover enables a plurality of viewers to view a natural 3D image while moving freely.

SUMMARY OF THE INVENTION

The present invention is directed to provide an autostereoscopic 3D image display device using a line source and a pupil tracking system. The present invention minimizes brightness change of a 3D image caused by movement of a viewer in a conventional autostereoscopic 3D image display device, reduces crosstalk of binocular viewing point images of a viewer to that of a glasses-type 3D image display device, and minimizes reduction in the resolution of a 3D image.

The present invention is also directed to provide an autostereoscopic 3D image display device that overcomes the limitation of a position from which a viewer can view the optimum 3D image. Particularly, the present invention enables a viewer to view a 3D image of equal quality to an image viewed from the optimum viewing position, even when the viewer is moving in the distance direction (depth direction) to the 3D image display device.

The present invention is also directed to provide an autostereoscopic 3D image display device that overcomes the limitation of a conventional autostereoscopic 3D image display device that it can provide an optimum 3D image to only one viewer or can provide a 3D image to a plurality of viewers only within a range where movement is very restricted, and thus enables a plurality of viewers to continuously view natural 3D images while dynamically moving.

According to an aspect of the present invention, there is provided an autostereoscopic 3D image display device including: a backlight configured to include a plurality of line sources which are disposed at certain intervals; an image display panel configured to display a 3D image; a controller configured to control the backlight and a viewing point image of the image display panel; and a viewer position tracking system configured to determine a pupil position of a viewer and transfer position information to the controller, wherein, the image display panel provides two or more viewing points, the line sources configure two or more line source sets that are separately driven at the same time, and the two or more line source sets are sequentially driven.

Each of the line sources may be a self-emitting element selected from among an LED, an OLED, and an FED, or configured with an electrical high-speed shutter element including a light source and an FLCD, or a DMD.

The controller may provide a viewing point image to the image display panel in synchronization with the two or more line source sets that are sequentially driven according to a signal from the viewer position tracking system.

The signal from the viewer position tracking system may include real-time 3D position information on both eyes of the viewer, and the controller may provide a viewing point image in which a position corresponding to each eye of the viewer is closest to a center of a viewing zone of a viewing point, and remove other viewing point images, in synchronization with the two or more line source sets.

By using the 3D position information on both eyes of the viewer, the controller may provide the viewing point image in which the position corresponding to each eye of the viewer is closest to the center of the viewing zone of the viewing point, and remove the other viewing point images, in synchronization with the two or more line source sets for each 3D pixel line.

There may be a plurality of viewers, and the viewer position information may include position information on both eyes of the plurality of viewers.

When N number (where N is an integer from two to sixteen) of line source sets are provided and an interval between unit viewing points at a viewing position is substantially equal to a distance between both eyes of the viewer, viewing points formed by one of the line source sets and the image display panel move by 1/N of the interval between the unit viewing points from viewing points formed by the other of the line source sets which is adjacent to the one of the line source sets and the image display panel.

When the line source sets are sequentially driven, a corresponding viewing point image on the image display panel may be displayed in synchronization with the line source sets.

A line width of each of the line sources may be within 25% of a width of a pixel in the image display panel.

The two or more line source sets may be sequentially driven during one frame of an image, and the controller may provide a viewing point image during a portion of one frame of an image.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIGS. 8A, 8B, 9A and 9B are diagrams for describing a method of providing a 3D image to two viewers by using a four-viewing point image, a six-viewing point image, and the sequential driving of two line source sets according to an embodiment of the present invention;

FIG. 10 is a conceptual diagram for describing a design method of forming a viewing zone at the position of a viewer by using two line source sets and an image display panel providing N viewing points according to an embodiment of the present invention;

FIGS. 11A and 11B are conceptual diagrams for describing a method of providing respective viewing point images to both eyes of two viewers near the optimum viewing position according to an embodiment of the present invention; and FIGS. 12 and 13 are conceptual diagrams for describing the concept of a 3D pixel line and a method of controlling a viewing point image in units of a 3D pixel line when a viewer is moving in a depth direction, according to an embodiment of the present invention.

DETAILED DESCRIPTION OF EXEMPLARY EMBODIMENTS

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

Figure 3:
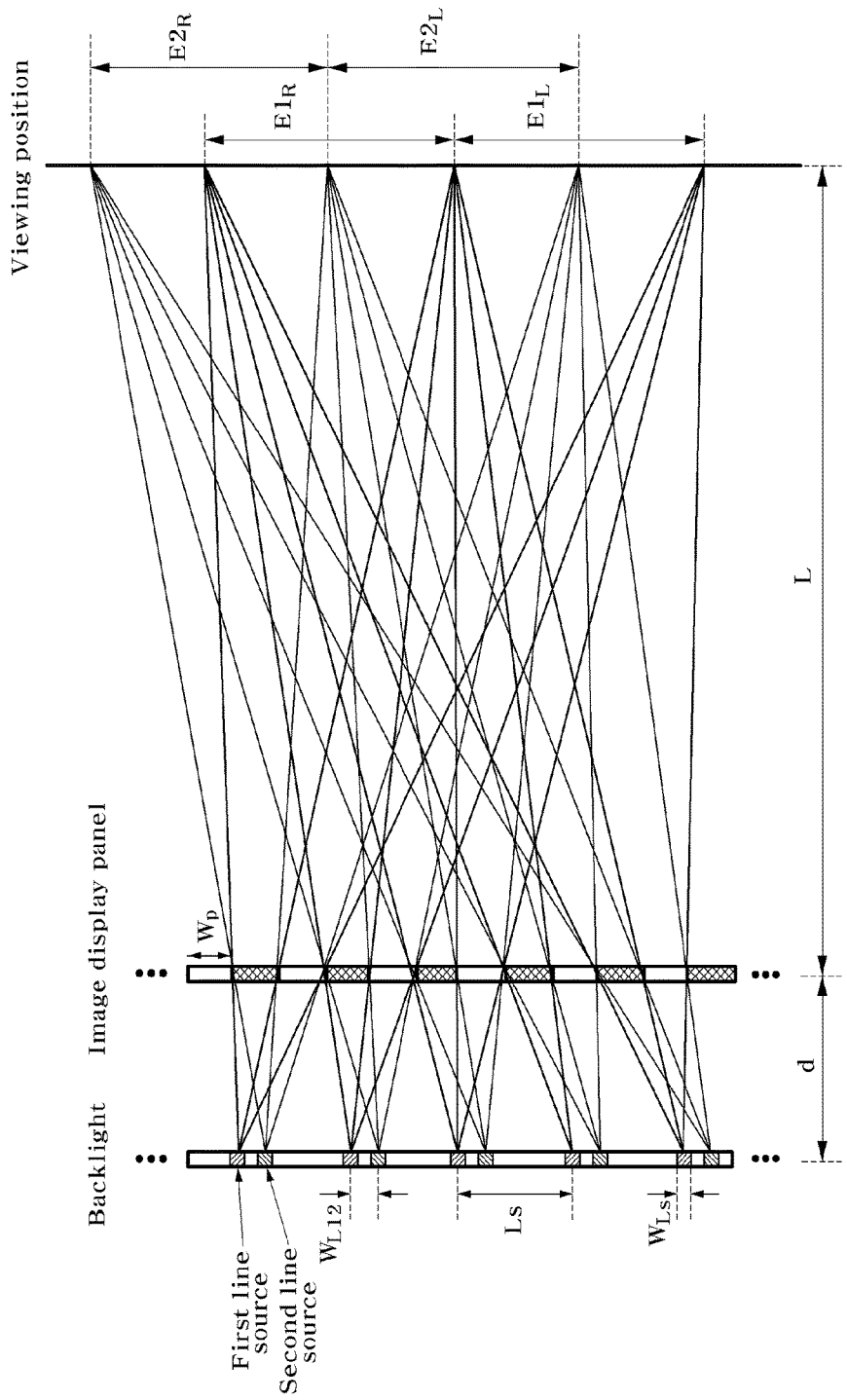
FIG. 3 is a conceptual diagram for describing a multi-viewing point 3D image display device using a line source according to an exemplary embodiment of the present invention.

FIG. 3 is a conceptual diagram for describing a multi-viewing point 3D image display device using a line source according to an exemplary embodiment of the present invention.

Referring to FIG. 3, the 3D image display device includes: an image display panel that provides at least two viewing points to display a 3D image; and a backlight that is disposed to be separated by a certain distance from a rear surface of the image display panel. The backlight includes a plurality of line sources (hereinafter referred to as a first line source set), and a second line source set that includes a plurality of line sources other than the first line source set.

The plurality of line sources that configure the first line source set of the backlight are disposed at certain intervals and allow viewing zones for respective viewing points to be separated at a viewing position of FIG. 3 in image information formed on the image display panel. In this case, a separation distance between the line sources configuring the second line source set may be the same as a separation distance Ls between the line sources of the first line source set. Also, one line source of the first line source set and a line source of the second line source set adjacent thereto are separated from each other by a certain distance $W_{L12}$. In the design of two viewing points of FIG. 3, a separation distance $W_{L12}$ between two line source sets may be one-fourth of an interval Ls between line sources of each line source set. In this condition, a viewing zone formed by the first line source at a viewing position and a viewing zone formed by the second line source at the viewing position are formed by moving by half of an interval between viewing points.

Figure 4:
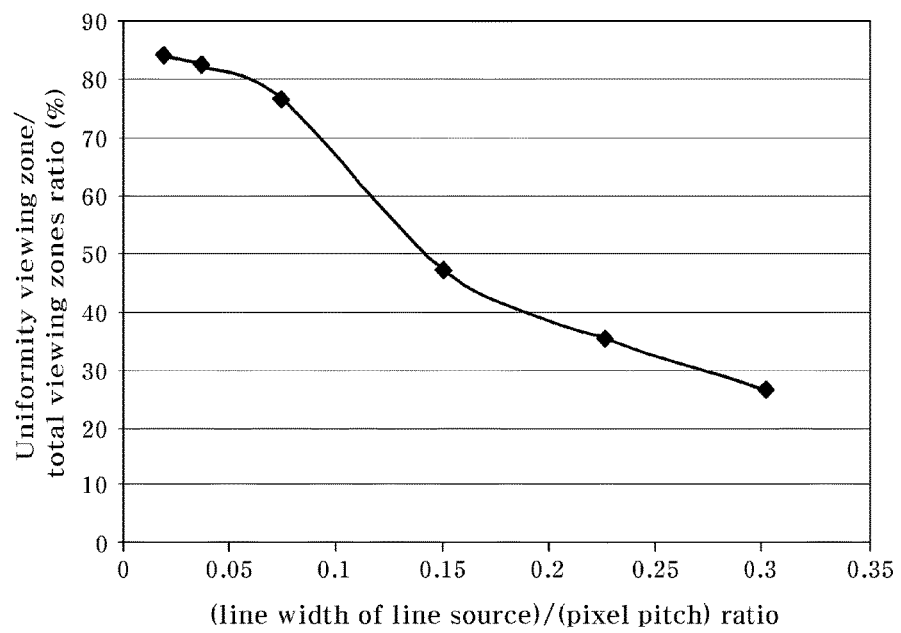
FIG. 4 shows viewing uniformity simulation results based on the line width of a line source according to an embodiment of the present invention.

In such a configuration, the size of a uniform region of a brightness distribution of a viewing zone at each binocular viewing point, which is formed when each line source set operates at a viewing position, is relevant to a line width $W_{LS}$ of each of line sources configuring each line source set. That is, FIG. 4 shows that as the line width of a line source to the pixel pitch of the image display panel decreases, the uniform region of a viewing zone (which is formed by the first and second line source sets and the pixels of the image display panel displaying a viewing point image) increases. The line width of a line source to a pixel pitch may become 0.25 or less, and thus the size of the uniform portion of a viewing zone may become 30% or more of an entire size.

Hereinafter, as described above with reference to FIG. 3, the principle of providing a clear 3D image with no crosstalk when a viewer is moving by using the image display panel providing two-viewing point image information and two line source sets will be described with reference to FIGS. 5 and 6.

Figure 5:
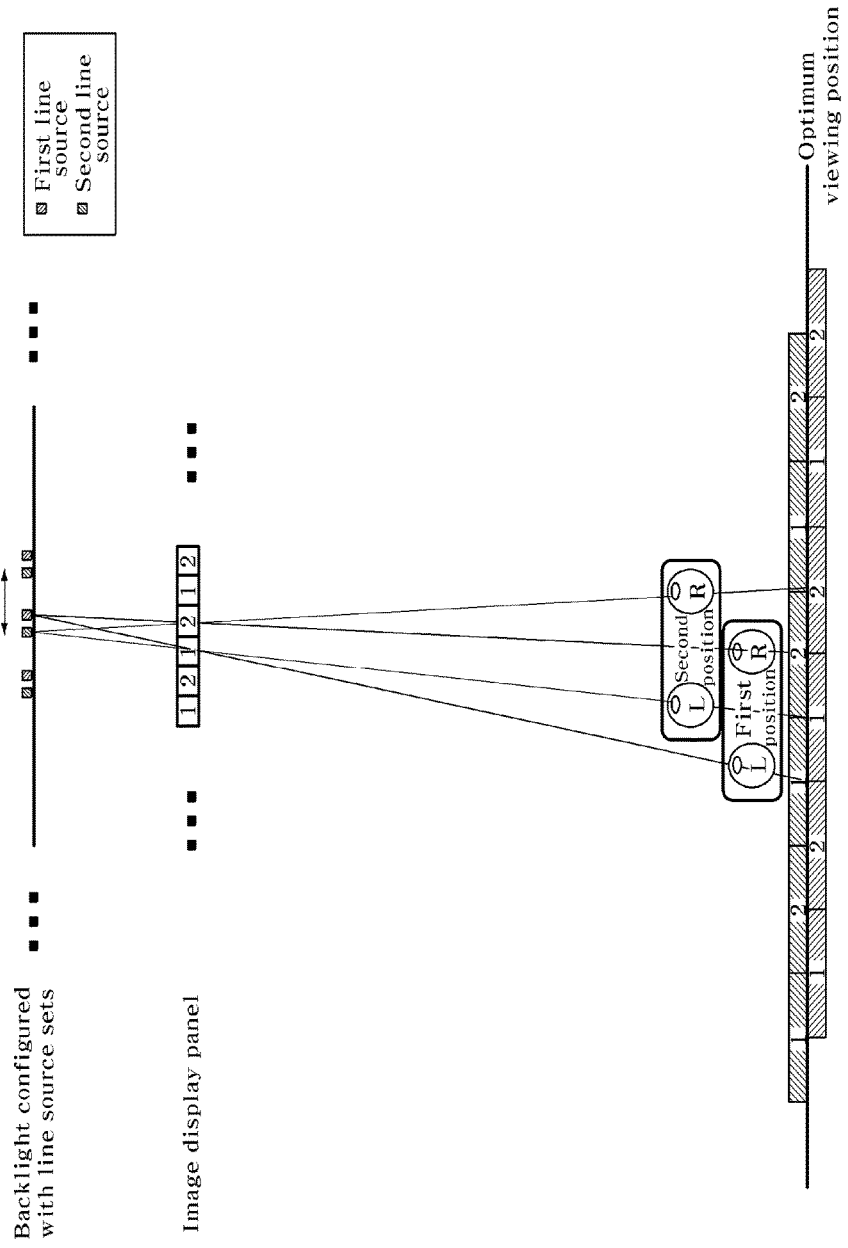
FIGS. 5 and 6 are conceptual diagrams for describing a method of sequentially driving two line source sets and providing two viewing point images according to the position of a viewer, according to an embodiment of the present invention.
Figure 6:
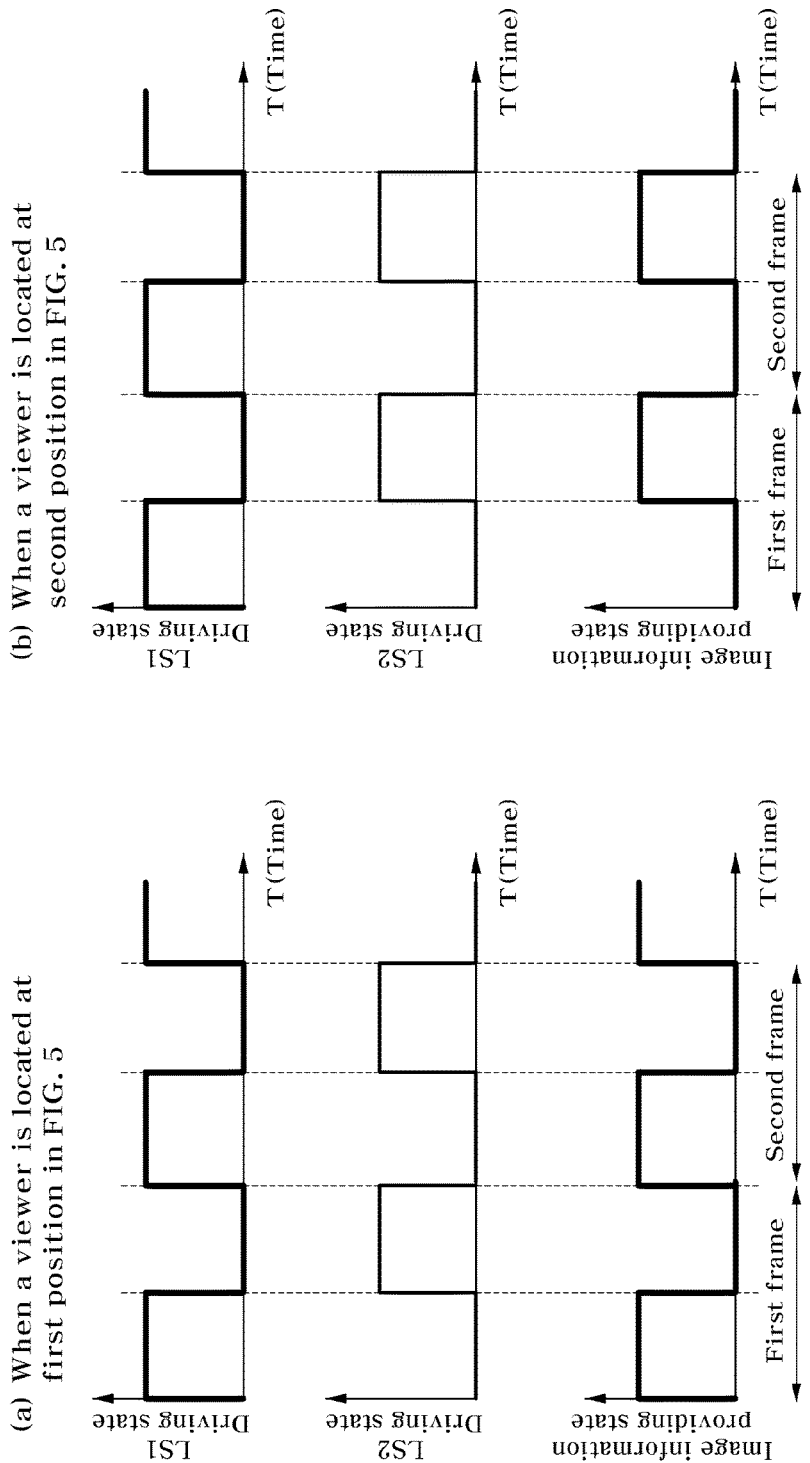

FIGS. 5 and 6 are conceptual diagrams for describing a method of sequentially driving two line source sets and providing two viewing point images according to the position of a viewer, according to an embodiment of the present invention. The backlight and image display panel of FIG. 5 satisfy the conditions of the backlight and image display panel that have been described above with reference to FIG. 3, and an interval between viewing points is 65 mm, which is the interval of the average movement space of a viewer.

As shown in FIG. 5, at the optimum viewing position, a viewing zone position (viewing zones 1 and 2) that is formed by the first line source set and the image display panel displaying two-viewing point image information, and a viewing zone position (viewing zones 1' and 2') that is formed by the second line source set and the image display panel, are moved by half of an interval between viewing points and disposed. The 3D image display device according to an embodiment of the present invention includes a pupil position tracking system (not shown) that tracks the pupil position information of a viewer, in addition to the image display panel and backlight of FIG. 5. Also, the 3D image display device includes first and second line source sets that are alternately turned on with time by using the tracked pupil positions of both eyes of the viewer, and a controller (not shown) that controls in real time image information provided to the image display panel.

In FIG. 5, it is shown that first and second positions of the viewer have a difference in a depth direction for differentiation. However, it is assumed that two viewing positions do not largely deviate from the optimum viewing position in the depth direction. In this case, when the viewer is located at the first position or the viewer is located at the second position, an example in which the driving of the two line source sets and the provision of image information by the image display panel are synchronized will be described with reference to FIG. 6. As shown in FIG. 6, the first and second line source sets are sequentially turned on at an equal interval in one frame irrespective of the position of the viewer. However, when the viewer is located at the first position, the center of each eye of the viewer is located near the central region of a viewing zone formed by the first line source set, and thus a method in which the controller provides image information to the image display panel respectively provides binocular viewing point images to first and second viewing point pixels of the image display panel only when the first line source set has been turned on, and removes a viewing point image from on the image display panel when the second line source set is being turned on (see a portion (a) of FIG. 6). When the viewer is located at the second position, the center of each eye of the viewer is located near the central region of a viewing zone formed by the second line source set, and thus the method removes viewing point images from the image display panel when the first line source set is being turned on, and respectively provides binocular viewing point images to the first and second viewing point pixels of the image display panel only when the second line source set is being turned on (see a portion (a) of FIG. 6). As shown in the portions (a) and (b) of FIG. 6, a time for which an image is actually provided at an arbitrary position of the viewer is a half frame, but the viewer feels as if the viewer continuously views 3D images by the image-sticking effect of a previous image. For example, in consideration of a time for which an image-sticking effect is continued, one frame may be shorter than a minimum of 1/30 sec (i.e., 30 Hz or more).

Figure 7:
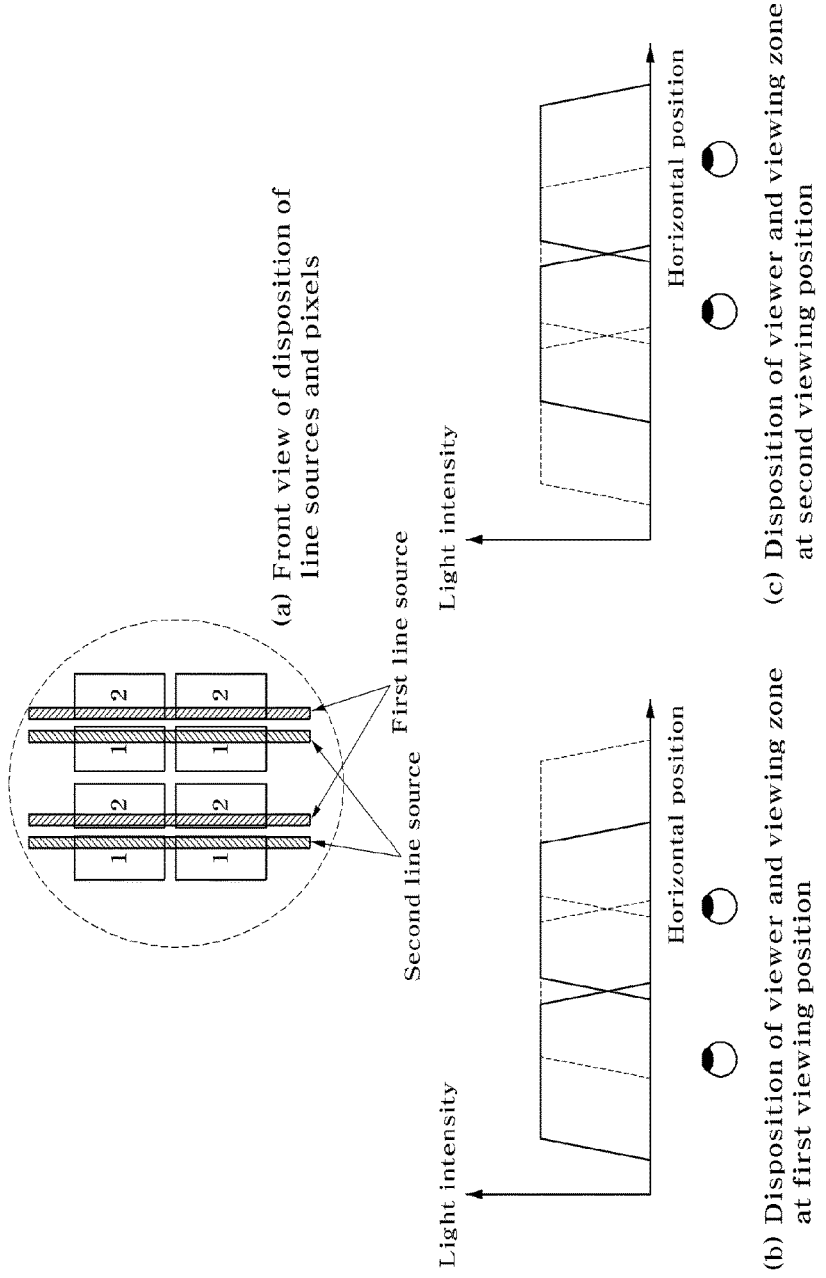
FIG. 7 is a conceptual diagram for describing a viewing zone formed by sequentially driving the line sources of FIG. 6 and providing the viewing point images of FIG. 6 at respective positions of two viewers of FIG. 5.

As a result, referring to FIG. 7, the pupils of both eyes of a viewer who is located at a first viewing position are located in the central portion of a viewing zone formed by a viewing point image on the image display panel that is synchronized with the turning on of the first line source set, and the pupils of both eyes of a viewer who is located at a second viewing position are located at the central portion of a viewing zone formed by a viewing point image on the image display panel that is synchronized with the turning on of the second line source set. Accordingly, even when a viewer is moving, an image brightness distribution is not largely changed, and the viewer can continuously view 3D images with minimal crosstalk.

The above embodiments of the present invention are applied to a case in which one viewer moves near the optimum viewing position, by using the two line source sets and two-viewing point image information. Expanding on those embodiments, other embodiments of the present invention applied to a case in which one or more viewers are capable of viewing a clear 3D image when moving by using two or more line source sets and two or more multi-viewing point image information will be described below.

Figure 8B:
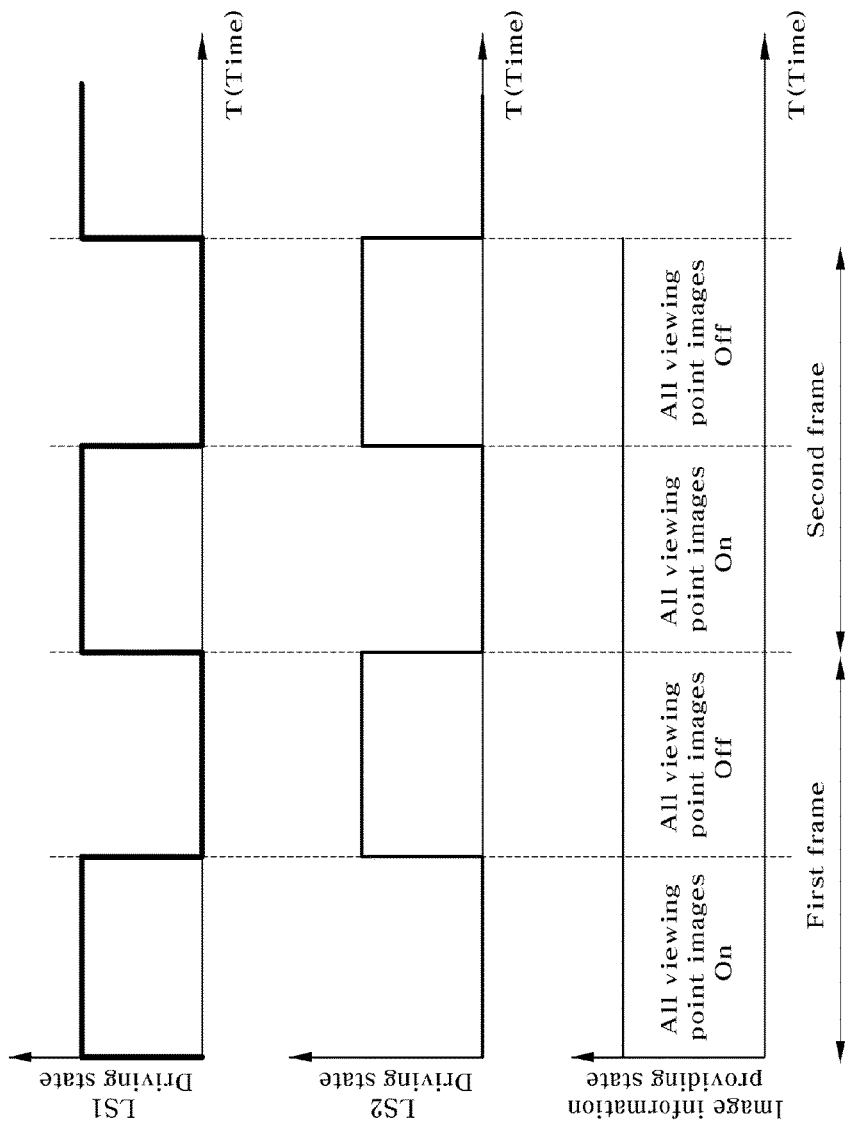

FIGS. 8A and 8B are for describing a method according to another embodiment of the present invention in which two viewers are capable of viewing a 3D image from respective positions thereof even when moving by using two line source sets and four-viewing point image information. Referring to FIG. 8A, four viewing points for the pixels of the image display panel are arranged in a horizontal direction, and a distance $W_{L12}$ between the two line source sets is set to one-eighth of a separation distance $L_S$ between line sources of one line source set. The pupils of both eyes of a viewer 1 are located near the center of viewing zones formed by the first line source set and first and second viewing point pixels of the image display panel, and the pupils of both eyes of a viewer 2 are located near the center of viewing zones formed by the first line source set and third and fourth viewing point pixels of the image display panel. In this case, similarly to FIG. 6, two line source sets are sequentially driven in units of half frames. In FIG. 8A, the pupils of both eyes of two viewers are located near the center of a viewing zone formed by the first line source set, and thus first to fourth viewing points are provided only when the first line source set has been turned on, but when the second line source set has been turned on, all viewing point images are removed. FIG. 8B shows a graph of a state in which image information is provided to the image display panel according to driving states of the first and second line source sets. Although not shown in FIG. 8A, when two viewers horizontally move in a right direction and the pupils of both eyes of the two viewers are located near the center of a viewing zone formed by the second line source set, the first to fourth viewing points are provided only when the second line source set has been turned on, but when the first line source set has been turned on, all viewing point images are removed, thus enabling the two viewers to view a 3D image with no crosstalk. However, when four viewing point images are used as shown in FIG. 8A, the two viewers can view a 3D image with no crosstalk only when the two viewers are separated by an interval (65 mm) equal to one viewing point, but in the other cases, the two viewers can experience crosstalk in a portion of a binocular image. Therefore, for two viewers, it is necessary to secure one or more space viewing points, in addition to the four viewing points that are a minimum number of necessary viewing points.

Figure 9A:
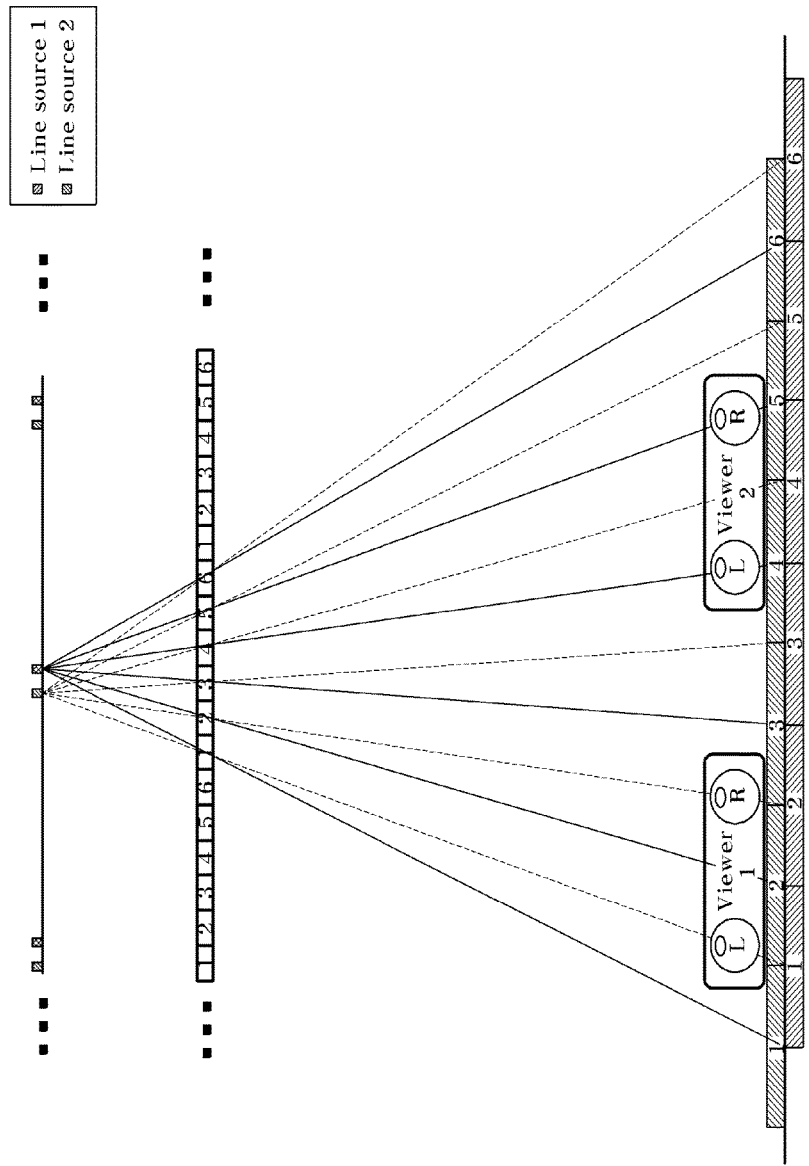

FIG. 9A shows a case in which six viewing point images are used, unlike in FIG. 8A. In FIG. 9A, the pupils of both eyes of a viewer 1 are located near the center of viewing zones formed by the second line source set and first and second viewing point pixels of the image display panel, and the pupils of both eyes of a viewer 2 are located near the center of viewing zones formed by the first line source set and fourth and fifth viewing point pixels of the image display panel. In this case, as shown in FIG. 9B, when the second line source set is being driven, first and second viewing point images are provided and the other viewing point images are removed, thereby providing a viewing point image to both eyes of the viewer 1. When the first line source set is being driven, fourth and fifth viewing point images are provided and the other viewing point images are removed, thereby providing a viewing point image to both eyes of the viewer 2. As a result, the pupils of both eyes of each of the viewers 1 and 2 are located near the center of a viewing zone formed by the line source sets and the viewing point pixels, and thus the viewers 1 and 2 can view a clear 3D image. Although not shown, when six viewing point images and two line source sets are used, as shown in FIG. 9A, it can be seen that a spare position, at which two viewers are capable of viewing a clear 3D image while moving without interference therebetween, increases compared to a case in which four viewing point images and two line source sets are used, as shown in FIG. 8A.

In this way, a viewer is located in order for the positions of the pupils of the viewer to not overlap, and thus when two line source sets are being driven, a viewing point image corresponding to the pupils of both eyes of the viewer is provided while the viewer moves, and the other viewing point images are removed. Accordingly, the present invention can provide a 3D image in which the brightness of a viewing point image does not change even when a viewer is moving and crosstalk between binocular viewing points is minimized.

Hereinafter, the principle of providing a clear 3D image with no crosstalk when one or more viewers (who are located near the optimum viewing position) are moving by using N viewing points and two line source sets according to another embodiment of the present invention will be described.

Referring to FIG. 10, an autostereoscopic 3D image display device according to another embodiment of the present invention includes an image display panel that displays N number of image information (where N is an integer more than or equal to two), and a backlight. Here, the backlight includes a first line source set including a plurality of line sources which are separated from each other at certain intervals, and a second line source set that is separated from the first line source set by a certain distance in a horizontal direction (x-axis direction). FIG. 10 shows the position of a viewing zone formed by each of the line source sets in the horizontal direction (x-axis direction) from the optimum viewing distance. FIG. 10 shows pixels that provide N viewing point images on an X-Z plane, for convenience. However, the 3D image display device may be designed such that the pixels providing the N viewing point images are distributed in a vertical direction (y-axis direction). Also, a plurality of line sources configuring a line source set are separated from each other at certain intervals in the horizontal direction, and a distance $W_{L12}$ between the nearest line sources of two line source sets has a relationship of $1/(2N \times L_S)$. In FIG. 10, a pixel width $W_P$, the optimum viewing distance $L_O$, a distance d between the backlight including the line sources and the pixels of the image display panel, and an interval E between viewing points have the following relationships.

$$L_S = NW_P \frac{d + L_O}{L_O} \quad (1)$$

$$d = \frac{W_P L_O}{E - W_P} \quad (2)$$

$$L_S = NW_P \frac{E}{E - W_P} \quad (3)$$

Equation (3) is obtained by substituting Equation (2) into Equation (1). Furthermore, when $W_{L12}$ is calculated by using the above mathematical relations between $W_{L12}$ and $L_S$, $W_{L12}$ is expressed as the following Equation (4) or Equation (5).

$$W_{L12} = \frac{W_P(d + L_O)}{2L_O} \quad (4)$$

$$W_{L12} = \frac{W_P E}{2(E - W_P)} \quad (5)$$

As seen in Equations (4) and (5), $W_{L12}$ is half of the pixel width $W_P$ approximately. However, a separation distance $L_S$ between line sources in one line source set is proportional to the number N of viewing points. In FIG. 10, the concept of the present invention uses N number of viewing points. However, when the N viewing points are not fixed, the separation distance $L_S$ in one line source set needs to vary according to the number of viewing points, and thus the line sources of the backlight are actually disposed at certain intervals that satisfy Equation (4) or (5), and a set of actually driven line sources may be selected from among the line sources (which are disposed at certain intervals) according to the number of viewing points of image information on the image display panel. The line sources of the backlight may be configured with self-emitting elements, which are driven at a high speed, such as LEDs, FEDs, or OLEDs. Also, the line sources of the backlight may be configured with high-speed external light sources or optical elements such as a lenticular lens, and disposed at certain intervals in the image display panel.

FIG. 10 is designed such that an interval between viewing points is an average binocular interval (about 65 mm) of a viewer. FIG. 10 shows a case in which two line source sets are provided by moving a plurality of viewing zones (which are formed at the optimum viewing position) by ½ together with the pixels of the image display panel, but, according to an embodiment, M number (where M is an integer from two to sixteen) of line source sets in which 1/M viewing zones move may be provided.

Currently available LCDs are driven at 480 Hz. When desiring to drive first to Mth line source sets at 30 Hz, which is the lowest driving speed and in which an image-sticking effect is maintained, M is sixteen. That is, when driving first to sixteenth line source sets at a speed obtained by dividing 480 Hz by 16 and providing image information on a corresponding pixel in synchronization with the speed, one frame that corresponds to one period in driving a line source set is driven at 30 Hz.

As the number of line source sets increases, a time for which one line source set is turned on is shortened, and thus light emission efficiency decreases, but the pupils of a viewer are more accurately located at the center of a viewing zone according to the position of the viewer. Also, lines that connect the optimum viewing position and the line sources of FIG. 10 represent light paths that connect the center of a corresponding viewing zone and line sources. A light path illustrated as a solid line represents the path of light emitted from the first line source set, and a light path illustrated as a dot line represents the path of light emitted from the second line source set.

Hereinafter, the principle that enables two viewers near the optimum viewing position to view a clear 3D image without interference while freely moving in the 3D image display device of FIG. 10 will be described. Specifically, the principle is the same as that of FIGS. 5 to 9, and thus the description will not be repeated.

Figure 11A:
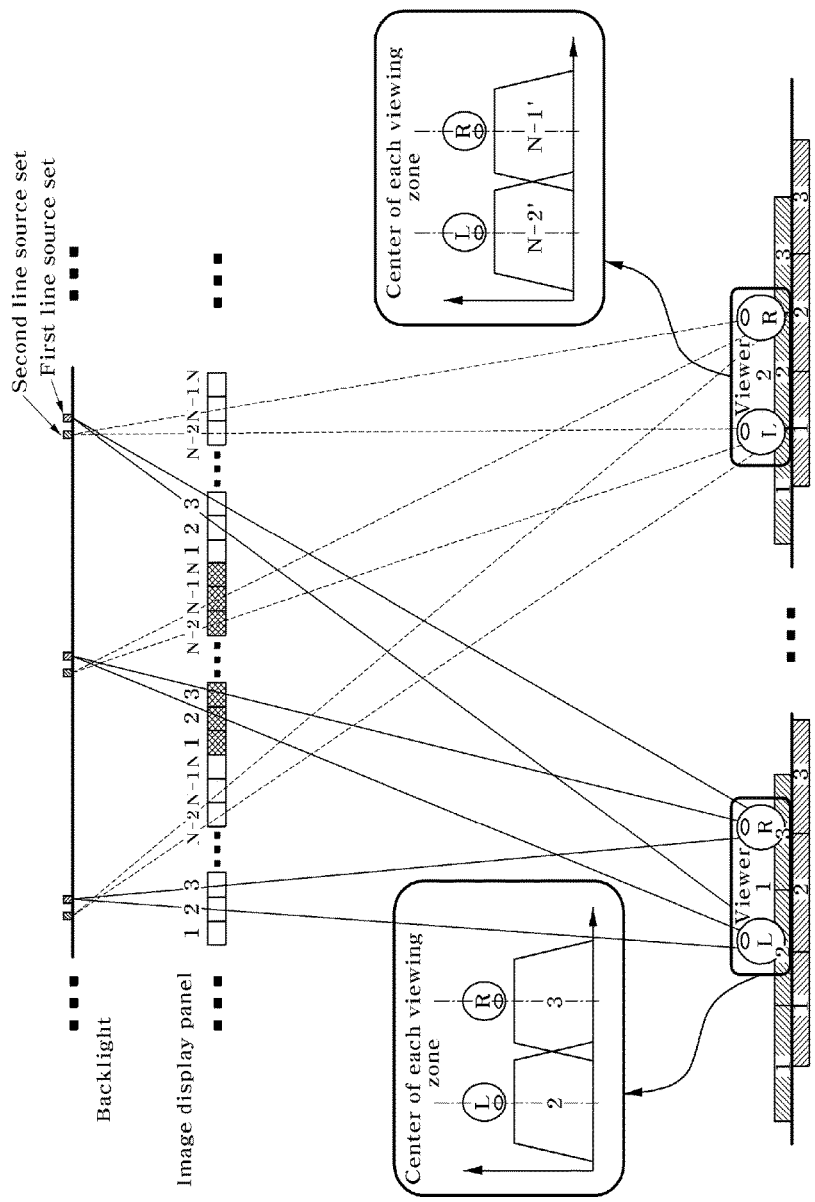

Referring to FIG. 11A, when two viewers near the optimum viewing position are respectively located at the center of a viewing zone (which is formed by the first line source set) and the center of a viewing zone formed by the second line source set, as shown in FIG. 11B, the first line source set is driven during half of one frame, and the second line source set is driven during the other half frame. Also, the controller receives viewer position information that has been tracked by the pupil tracking system tracking the pupils of a plurality of viewers, and while the first line source set is turned on, the controller provides left and right images for a viewer 1 to second and third viewing point pixels of the image display device, or while the second line source set is turned on, the controller provides left and right images for a viewer 2 to N−21th and N−1th viewing point pixels of the image display device. By removing images of respective pixels that display the other viewing point images, two viewers can separately view a 3D image in which crosstalk is minimized and the brightness uniformity of left and right images is secured.

Furthermore, even though the two viewers of FIG. 11A move, the controller provides only a viewing point image close to the center of the pupil of each viewer from the position of each viewer in operational connection to two line source sets that sequentially operate during one frame, and removes the other images, thus continuously providing view a 3D image in which crosstalk is minimized and the brightness uniformity of an image is secured.

As described above in the embodiments of the present invention, the number of viewing points needs to increase in proportion to the number of viewers. In the present embodiment, the minimum number of viewing points necessary for each viewer is two, and thus a minimum of 2N viewing point images are prepared so as to enable the viewing of N viewers. As the number of viewing points increases, the resolution of the image display panel decreases proportionally. However, in the present invention, two viewing point images are allocated to each viewer, and two spare viewing point images according to the position movement of a viewer are provided through time division, thus minimizing the decrease in resolution due to the increase in the number of viewers.

As another example, three or more line source sets that are sequentially driven during one frame may be provided, and by disposing two or more viewing points within an interval between binocular viewing points, as in the above-described embodiments, three or more line source sets may be sequentially driven during one frame. Therefore, a viewing zone for each line source set is moved more naturally, and by tracking the pupils of a plurality of viewers in real time, a viewing image suitable for both eyes of the viewers is provided to pixels that display a viewing point image on the image display panel. In this case, the decrease in resolution is minimized, and a 3D image in which brightness is uniform and crosstalk is minimized is provided to a plurality of viewers.

In another embodiment of the present invention, even when a plurality of viewers deviate largely from the designed optimum viewing positions and move in a depth direction (z-axis direction), an optimum 3D image can be provided to the viewers. Hereinafter, this embodiment will be described with reference to FIGS. 12 and 13.

Figure 1:
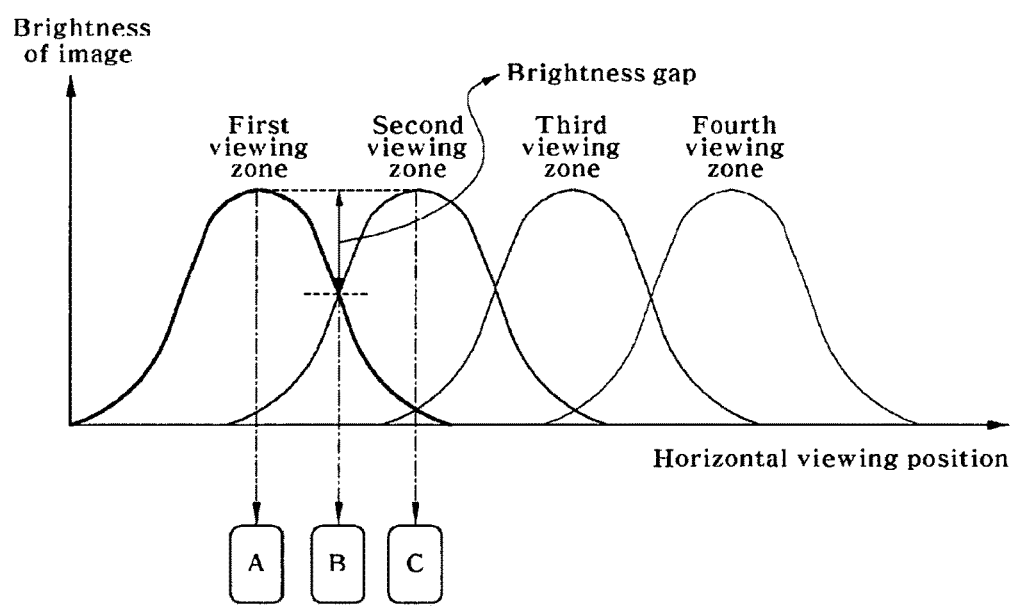
FIG. 1 is a conceptual diagram for describing a general viewing distribution at the position of a viewer in a conventional autostereoscopic 3D image display device.
Figure 2A:
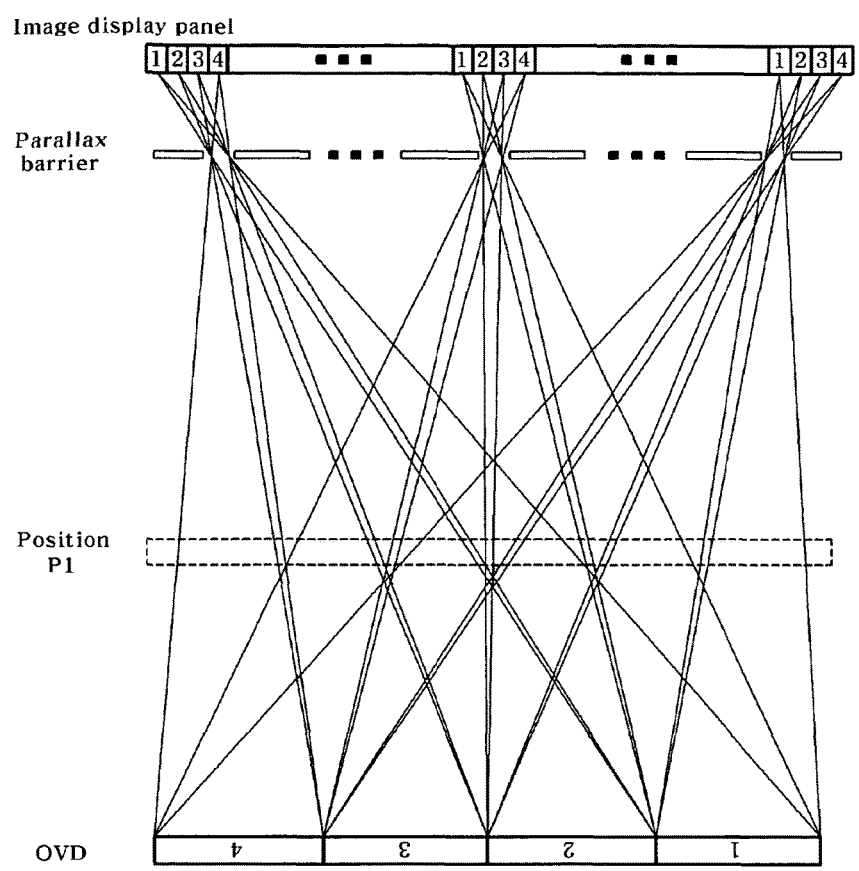
FIG. 2A is a conceptual diagram for describing drawbacks that occur when a viewer moves in a depth direction in a conventional autostereoscopic 3D image display device using a parallax barrier.
Figure 2B:
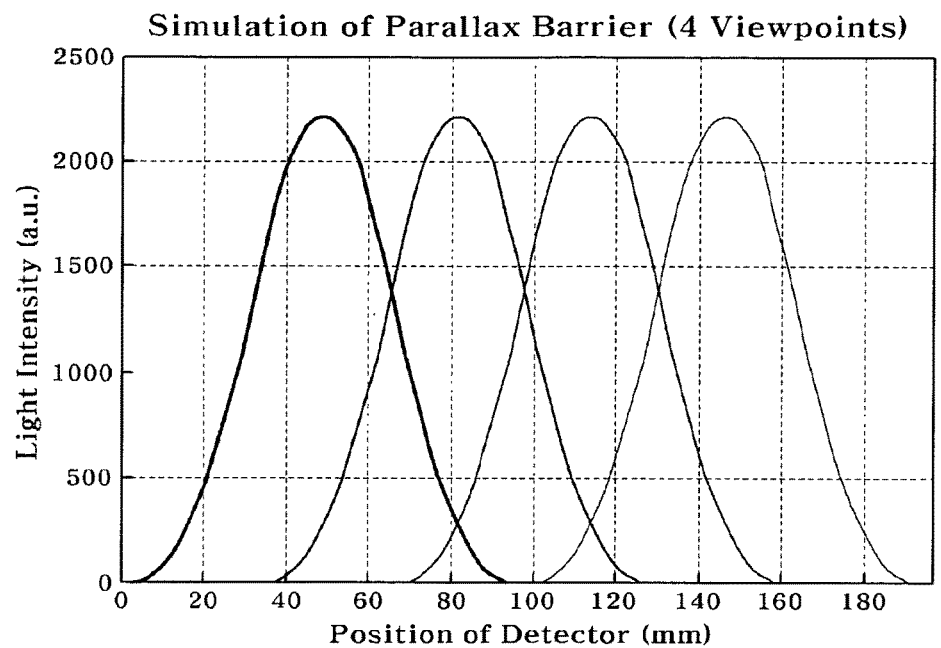
FIG. 2B shows a viewing distribution at the optimum viewing position in the conventional autostereoscopic 3D image display device using a parallax barrier.
Figure 2C:
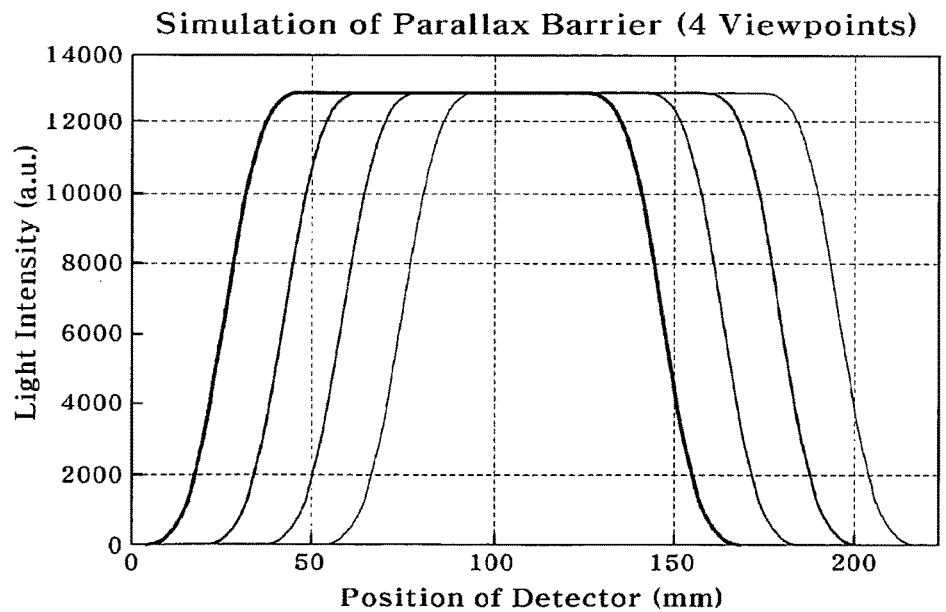
FIG. 2C shows the increase in crosstalk due to disparity between viewing zones when a viewer moves to a position P1 (which is a distance equal to half of an OVD depth) in the depth direction.
Figure 2D:
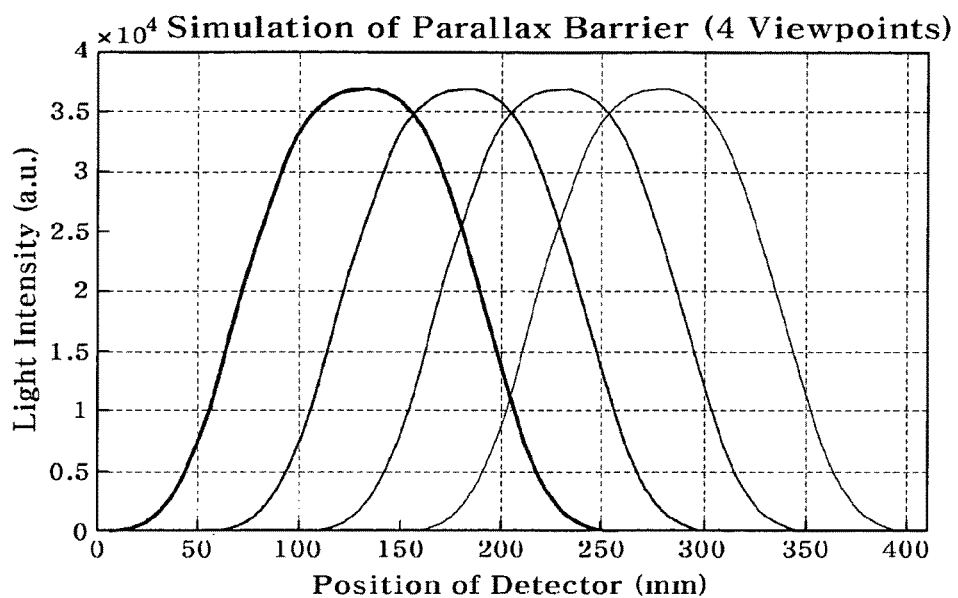
FIG. 2D shows the increase in crosstalk which occurs at a distance 1.5 times the OVD.

In the optimum viewing position, a design is made such that corresponding viewing images at a specific position with a viewing zone formed therein are all viewed from the OVD by two or more line source sets (which are driven at the optimum viewing position) and all pixels that display a viewing point image on the image display device. However, if a viewer deviates from the optimum viewing distance (OVD) position in a depth direction and moves to a position P1 (position of a distance 0.5 times the OVD), a viewing zone for a left-eye viewing point and a viewing zone for a right-eye viewing point are not normally separated or overlap with adjacent viewing zones, and thus the viewer cannot normally view a 3D image (see FIG. 2C for a viewing distribution at the position P1). Also, although not shown in FIG. 2, even when the viewer moves to the position of the distance 1.5 times the OVD, as shown in FIG. 2D, a viewing-zone shape is changed, and thus crosstalk increases. To provide a more detailed description on this with reference to FIG. 2C, considering the intersection of boundary lines between viewing zones in a dot line illustrated at the position P1 of FIG. 2A, when a pupil is located at the center of a viewing zone for one pixel at the position P1, although a viewing zone closest to the center of the pupil is selected from among viewing zones for different openings, depending on the case, much crosstalk is caused by all openings when a pupil is located at a boundary line between viewing zones. In this case, as described above, crosstalk per opening is inevitably maximized or nearly maximized. Therefore, crosstalk increases on average. This case occurs when a viewer deviates from the OVD. Accordingly, when a viewer deviates considerably from the OVD, much crosstalk occurs at all positions, and thus a viewer cannot view a clear 3D image. That is, a viewer 1 located at the optimum viewing position of FIG. 12 receives a left-eye image from all pixels that display number 2 image on the image display panel, and receives a right-eye image from all pixels that display number 3 image, thus enabling the viewer 1 to view a clear 3D image. However, when the viewer moves to a second position, as described above, the viewer views a 3D image whose crosstalk has increased.

Figure 2E:
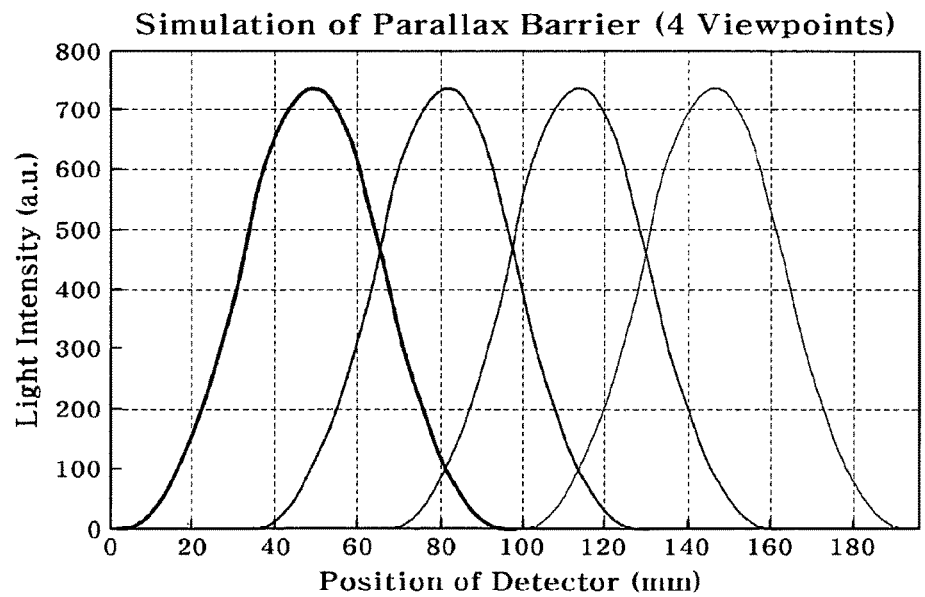
FIG. 2E shows a viewing distribution at the OVD by 3D pixel lines when a viewing zone is considered in units of a 3D pixel line.
Figure 2F:
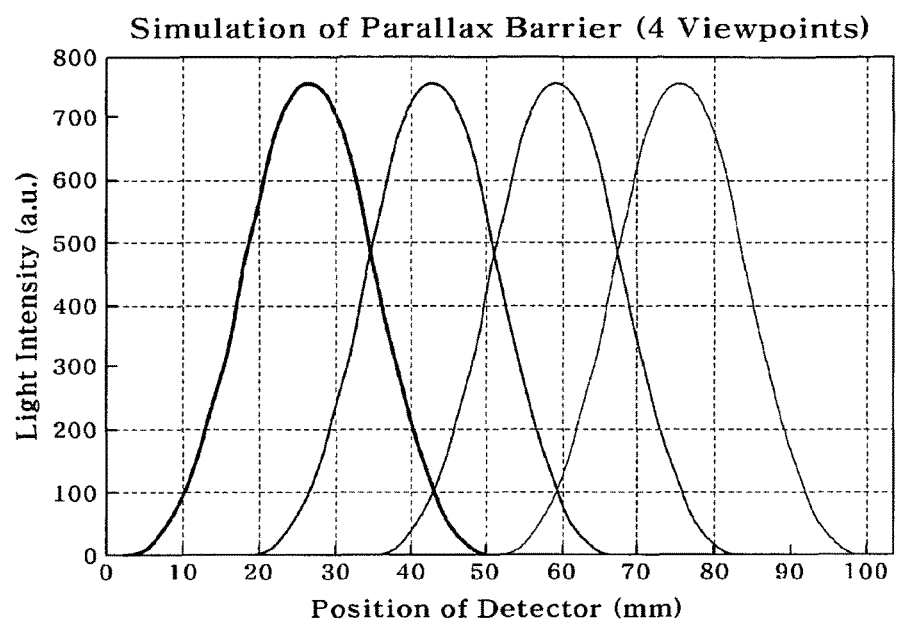
FIG. 2F shows a viewing distribution by 3D pixel lines when the viewer moves to the position P1 (half of the OVD) in the depth direction.
Figure 2G:
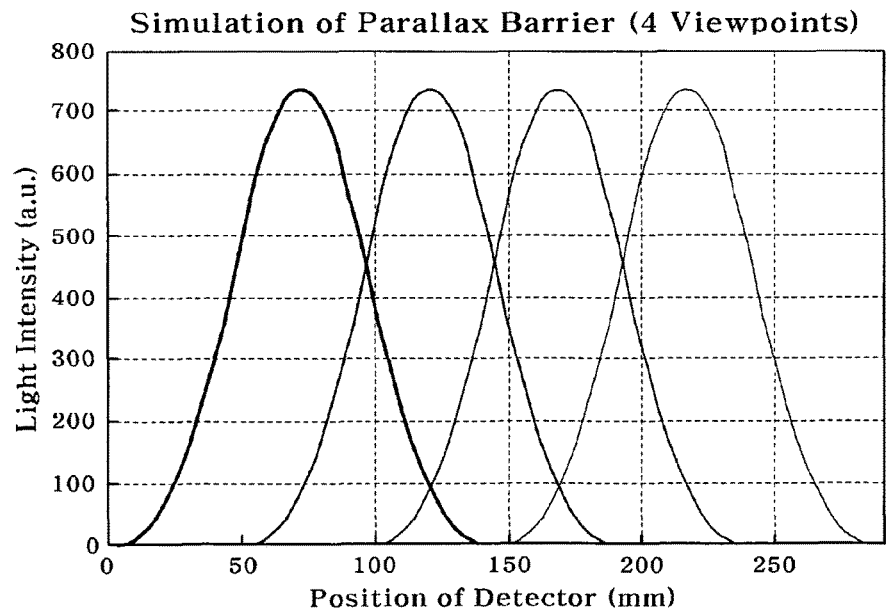
FIG. 2G shows a result in which a viewing distribution is almost unchanged by depth movement, considering a viewing distribution in units of a 3D pixel line by simulating a viewing distribution when the viewer moves to a distance 1.5 times the OVD in a direction away from the OVD position.

Therefore, as shown in FIGS. 2E, 2F and 2G, in a parallax barrier, considering only one opening line (i.e., one 3D pixel line), as in the OVD (see FIG. 2E), even when the position of a viewer is a distance 0.5 times the OVD (see FIG. 2F) and the position of the viewer is a distance 1.5 times the OVD (see FIG. 2G), the shape of a viewing zone is almost unchanged. Accordingly, when a line source and a pixel that correspond to the optimum position of each pupil are selected by applying the method of FIG. 7 to each 3D pixel line, crosstalk is minimized or the brightness of a corresponding viewing zone is not changed. The shape of a viewing zone for each 3D pixel line in FIG. 2A is similar to Gaussian, and the shape of a trapezoidal viewing zone for each 3D pixel line in FIG. 7 differs from Gaussian. This is because the shape of a viewing zone is changed by decreasing the width of a line source. When applying this principle, the shape of a viewing zone in each of FIGS. 2E, 2F and 2G is changed from a shape similar to Gaussian to a trapezoidal shape, and thus a shape that is unchanged according to distance may be obtained through simulation similarly.

Figure 12:
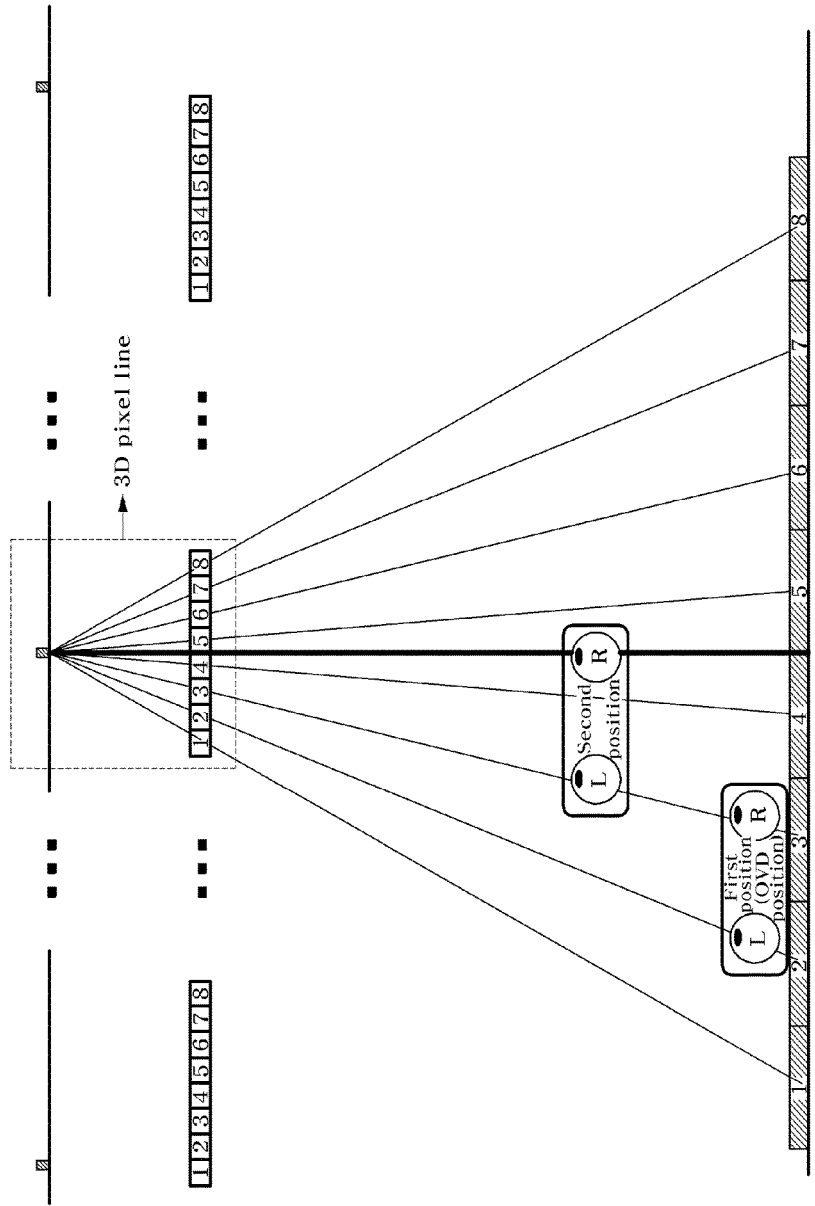

The need to apply the present invention for each 3D pixel line will be described with reference to FIG. 12. FIG. 12 shows a case that uses only one line source. In this case, when both eyes of a viewer are located at a first position, the viewer views a 3D image with minimal crosstalk. However, when it is assumed that both eyes of a viewer move to a second position, the left eye of the viewer views a 3D image with minimal crosstalk, but the pupil of the right eye of the viewer is located at the center between number 4 viewing zone and number 5 viewing zone, and thus when respective viewing point images of two pixels are provided, crosstalk is maximized. In this case, when only the viewing point image of one of the two pixels is provided, brightness is changed, or depending on the case, the change in brightness is not viewed according to the precision of pupil tracking Therefore, the right eye views a case in which crosstalk is high or brightness is low. Considering this case for each 3D pixel line, when the left and right eyes deviate from the optimum depth, at least a certain amount of crosstalk is viewed on average, or brightness is changed. Thus, to solve the case of FIG. 12 for each 3D pixel line, in applying the solution method of FIGS. 5 to 9, when two line source sets are used, time division is applied, and a viewing point image corresponding to a corresponding line source for each 3D pixel line is provided according to the positions of the pupils of both eyes, crosstalk is minimized and change in brightness is minimized in all conditions. Accordingly, the case of FIG. 13 may be considered. That is, considering a plurality of 3D pixel lines that include two line sources (which operates in time division) at the center, as in the case of FIG. 12, the left eye of a second position's viewer is satisfied by providing a left-eye image to corresponding number 3 pixel when a first line source operates. However, unlike in FIG. 12, providing a right-eye image to one of number 4 pixel and number 5 pixel when a first line source operates, since the right eye of the second position's viewer is located at the end boundary of a corresponding viewing zone, the right eye views the change in brightness of a corresponding viewing zone, or cannot view the change in brightness according to the precision of pupil tracking. When providing an image to all of two pixels, the maximized crosstalk of the two pixels are viewed. However, when second line source operates, providing an image 4' to number 4 left-eye pixel, since a right eye is located at a central viewing zone thereof, a corresponding pixel for a right-eye image that satisfies the optimum condition is viewed. In the present embodiment, only a 3D pixel line that is configured with two central line sources is considered, but when applying all 3D pixel lines in the method of FIG. 13, the optimum 3D image in which crosstalk is minimized or the decrease in brightness is minimized can be viewed in all conditions. That is, even though a viewer moves in a depth direction, by synchronizing and operating a pixel and a line source corresponding to the pixel viewing zone of a line source closest to the center of a left eye or a right eye among viewing zones formed by second line source and a first line source for every 3D pixel, an autostereoscopic 3D image display device in which crosstalk is minimized or change in brightness is minimized can be implemented. Such a method may be applied to a case in which depths differ, in consideration of an application example for the plurality of viewers of FIG. 11.

In this way, a 3D pixel line is defined, and then the controller of the image display device receives the positions of the pupils of a viewer that are fed back from the pupil position tracking system, dynamically resets a plurality of 3D pixel lines in the image display panel, and sets a viewing point corresponding to a left-eye pupil and a viewing point corresponding to a right-eye pupil with respect to a viewing point closest to the center of the pupils of both eyes among viewing points in which respective 3D pixel lines are formed. Furthermore, by removing the other viewing point images, crosstalk is minimized, or change in brightness of a corresponding image is minimized.

As described above, according to the present invention, provided is a 3D image display device that adjusts the line width of a line source to less than a certain level, time-division-drives two or more line source sets, and determines the position of a viewer in a 3D space to dynamically generate a viewing point image by using the pupil tracking system, thus dynamically minimizing crosstalk to the pupil of the viewer even when the viewer is moving in the 3D space, minimizing change in the brightness of a viewing point image corresponding to the pupil, and enabling a plurality of viewers to view a natural 3D image. Especially, the present invention provides a 3D image display device in which reduction of the resolution of a 3D image due is minimized independently from increase in the number of used line light sets.

It will be apparent to those skilled in the art that various modifications can be made to the above-described exemplary embodiments of the present invention without departing from the spirit or scope of the invention. Thus, it is intended that the present invention cover all such modifications provided they come within the scope of the appended claims and their equivalents.

What is claimed is:

1. An autostereoscopic three-dimensional (3D) image display device, comprising:
    a backlight configured to comprise a plurality of line sources which are disposed at certain intervals;
    an image display panel configured to display a 3D image;
    a controller configured to control the backlight and the image display panel; and
    a viewer position tracking system configured to determine 3D position information of both eyes of a viewer and transfer a signal including the 3D position information to the controller,
    wherein, the image display panel provides two or more viewing points,
    the plurality of line sources including two or more line source sets,
    the controller configured to separately drive the two or more line source sets at the same time such that, for a single frame,
        i) during a first period of the single frame, a first line source set of the two or more line source sets is turned on while a second line source set of the two or more line source sets is turned off, and
        ii) during a second period of the single frame, the first line source set is turned off while the second line source set is turned on,
    wherein light emitted from the plurality of line sources toward the image display panel does not pass through a lenticular lens and a parallax barrier, and
    wherein the controller is configured such that,
        in response to determining that the viewer's eyes are in a first position, the controller provides first and second viewing point images to first and second viewing zones, respectively, by providing image information to the image display panel during the first period, and
        in response to determining that the viewer's eyes are in a second position, the controller provides the first and second viewing point images to third and fourth viewing zones, respectively, by providing image information to the image display panel during the second period, and
    wherein the controller is further configured such that,
        the first and second viewing zones are viewing zones, among a plurality of viewing zones, having centers that are closest to centers of pupils of the viewer's eyes, when the viewer's eyes are located at the first position, and
        the third and fourth viewing zones are viewing zones, among a plurality of viewing zones, having centers that are closest to the centers of the pupils of the viewer's eyes, when the viewer's eyes are located at the second position.

2. The autostereoscopic 3D image display device of claim 1, wherein, each of the plurality of line sources is a self-emitting element selected from among a light emitting diode LED, an organic light emitting diode OLED, and a field emission display FED, or each of the plurality of line sources is configured with an electrical high-speed shutter element including a light source and a ferroelectric liquid crystal display FLCD, or a digital micromirror device DMD.

3. The autostereoscopic 3D image display device of claim 1, wherein, there are a plurality of viewers, and the 3D position information comprises position information on both eyes of each of the plurality of viewers.

4. The autostereoscopic 3D image display device of claim 1, wherein when the two or more line source sets includes N line source sets are provided and an interval between unit viewing points at a viewing position is substantially equal to a distance between both eyes of the viewer, viewing points formed by one of the N line source sets and the image display panel move by 1/N of the interval between the unit viewing points from viewing points formed by another of the N line source sets which is adjacent to the one of the N line source sets and the image display panel, where N being an integer within a range of two to sixteen.

5. The autostereoscopic 3D image display device of claim 4, wherein when the N line source sets are driven, a corresponding viewing point image on the image display panel is displayed in synchronization with the line source sets.

6. The autostereoscopic 3D image display device of claim 1, wherein a line width of each of the line sources is within 25% of a width of a pixel in the image display panel.

7. The autostereoscopic 3D image display device of claim 1, wherein, the two or more line source sets are driven during one frame of an image, and the controller is configured to provide a viewing point image during a portion of one frame of an image.

8. The autostereoscopic 3D image display device of claim 1, wherein, there are a plurality of viewers, and the 3D position information comprises position information on both eyes of the plurality of viewers.

9. The autostereoscopic 3D image display device of claim 1, wherein the first line source set and the second line source set are turned on for equal intervals during the single frame.

10. The autostereoscopic 3D image display device of claim 1 wherein,
    the first line source set includes first line sources from among the plurality of line sources, and the second line source set includes second line sources from among the plurality of line sources, the first line sources and the second line sources being arranged such that at least one of the first line sources is between at least two of the second lines sources with respect to a first direction and at least one of the second line sources is between at least two of the first lines sources with respect to the first direction.

* * * * *